United States Patent
Furuya (10) Patent No.: US 7,793,085 B2
(45) Date of Patent: Sep. 7, 2010

(54) MEMORY CONTROL CIRCUIT AND MICROPROCESSORY SYSTEM FOR PRE-FETCHING INSTRUCTIONS

(75) Inventor: Kenji Furuya, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 656 days.

(21) Appl. No.: 11/024,843

(22) Filed: Dec. 30, 2004

(65) Prior Publication Data

US 2006/0095744 A1 May 4, 2006

(30) Foreign Application Priority Data

Sep. 6, 2004 (JP) .............................. 2004-258651

(51) Int. Cl.
*G06F 9/30* (2006.01)
(52) U.S. Cl. ....................... 712/237; 712/207; 712/233; 712/238
(58) Field of Classification Search ................. 712/207, 712/237, 238, 233
See application file for complete search history.

(56) References Cited

U.S. PATENT DOCUMENTS

| | | | | |
|---|---|---|---|---|
| 4,268,907 A * | 5/1981 | Porter et al. | ................ | 711/138 |
| 4,466,059 A * | 8/1984 | Bastian et al. | .............. | 711/122 |
| 4,928,239 A * | 5/1990 | Baum et al. | .................. | 711/136 |
| 5,946,705 A * | 8/1999 | Cumming et al. | ........... | 711/108 |
| 6,256,728 B1 * | 7/2001 | Witt et al. | .................... | 712/236 |
| 6,498,657 B1 * | 12/2002 | Kuntz et al. | ................. | 358/1.15 |
| 2002/0013894 A1 * | 1/2002 | Hoogerbrugge | ............. | 712/238 |
| 2002/0066053 A1 * | 5/2002 | Doi et al. | ...................... | 714/45 |
| 2003/0204705 A1 * | 10/2003 | Oldfield et al. | ............. | 712/207 |
| 2006/0190710 A1 * | 8/2006 | Rychlik | ...................... | 712/240 |

FOREIGN PATENT DOCUMENTS

| | | |
|---|---|---|
| JP | 2-56636 | 2/1990 |
| JP | 05-216665 | 8/1993 |
| JP | 09-305490 | 11/1997 |

OTHER PUBLICATIONS

Japanese Office Action issued on Jul. 21, 2009 in corresponding Japanese Patent Application 2004-258651.

* cited by examiner

*Primary Examiner*—Eddie P Chan
*Assistant Examiner*—William B Partridge
(74) *Attorney, Agent, or Firm*—Staas & Halsey LLP (57) ABSTRACT

A memory control circuit for providing a small-circuit-size memory control circuit capable of reducing a branch penalty during the execution of a branch instruction in a CPU. A branch-destination buffer caches a branch-destination instruction and a branch-destination-instruction address determined by a branch instruction executed by the CPU. When the CPU executes a branch instruction thereafter, if the branch-destination-instruction address output from the CPU matches an instruction address in the branch-destination buffer, the corresponding branch-destination instruction stored in the branch-destination buffer is sent to the CPU. When a branch instruction is executed, an address comparison circuit compares the branch-destination-instruction address with the branch-source-instruction address. A buffer-update control circuit updates data of the branch-destination buffer by the branch-destination instruction only when it is determined according to the result of comparison performed by the address comparison circuit that the instruction address has been changed in the negative direction by the instruction branch.

5 Claims, 10 Drawing Sheets

MEMORY CONTROL CIRCUIT AND MICROPROCESSORY SYSTEM FOR PRE-FETCHING INSTRUCTIONS

CROSS-REFERENCE TO RELATED APPLICATIONS

This application is based upon and claims the benefits of priority from the prior Japanese Patent Application No. 2004-258651, filed on Sep. 6, 2004, the entire contents of which are incorporated herein by reference.

BACKGROUND OF THE INVENTION

1. Field of the Invention

The present invention relates to memory control circuits provided with an instruction pre-fetch function, for controlling the reading of instructions to be fetched by the Central Processing Unit (CPU), from a memory and microprocessor systems that include the memory control circuits, and particularly to a memory control circuit and a microprocessor system both having a reduced penalty-cycle occurrence rate during the execution of branch instructions.

2. Description of the Related Art

It has been conventionally known in microprocessor systems which use pipeline control that instruction data is read in advance from a main memory and buffered by an instruction pre-fetch function so as not to stagnate the flow of instructions to a CPU. In such a system, however, if an instruction branch occurs, instruction data read in advance by a pre-fetch cannot be used, the pre-fetch buffer is cleared, and the branch-destination instruction needs to be fetched. Therefore, until new data reaches the CPU, the flow of the pipeline stops, and processing performance is reduced.

To solve this issue, conventionally, an instruction cache memory which can be accessed at high speed is prepared and when the cache memory has the branch-destination instruction, the instruction is executed without any penalty cycle. In this case, however, if the branch-destination instruction is not cached, the instruction needs to be fetched. Therefore, the pipeline flow is stopped, and processing performance is reduced. To increase the hit rate of the instruction cache memory, the data capacity of the instruction cache memory needs to be made larger, which increases the circuit size and manufacturing cost.

There has been a microprocessor system (disclosed, for example, in paragraphs No. 0008 to No. 0011 and FIG. 1 in Japanese Unexamined Patent Publication No. 9-305490 (1997)) in which a counter is provided between a CPU and an instruction cache memory and has the number of instruction cache entries as its initial value, the counter is decremented every time an access is made to the instruction cache memory, the counter is initialized every time when a subroutine call occurs, or a branch is generated in the address negative direction, and the counter function is stopped when the instruction cache memory becomes full of data. This structure increases the hit rate of the instruction cache memory, obtained when a subroutine call occurs, or a branch is executed in the address negative direction.

In the conventional related art, there has been an instruction pre-fetch method (disclosed, for example, in paragraphs No. 0016 to No. 0020 and FIG. 1 of Japanese Unexamined Patent Publication No. 5-216665 (1993)) in which a buffer storage, an instruction pre-fetch circuit, and an instruction buffer are provided between a main memory unit and a CPU, a determination circuit determines whether a block transmitted to the buffer storage due to an instruction pre-fetch request includes a branch-destination instruction, and control is made according to the result of determination such that the instruction pre-fetch request is enabled or canceled.

In the microprocessor system disclosed in Japanese Unexamined Patent Publication No. 9-305490 (1997), described above, since the counter for counting the number of times the instruction cache memory is used is provided, the circuit size and manufacturing cost are increased. When the number of entries in the instruction cache memory is made larger, the hit rate of the instruction cache memory is increased during the execution of branch instructions. In this case, however, the size of the circuit which includes the instruction cache memory and the counter and manufacturing cost are increased.

SUMMARY OF THE INVENTION

In view of the foregoing, it is an object of the present invention to provide a memory control circuit that can reduce a branch penalty generated when a CPU executes a branch instruction and that has a small circuit size.

Another object of the present invention is to provide a microprocessor system that can reduce a branch penalty generated when a CPU executes a branch instruction and that has a small circuit size.

The present invention provides a memory control circuit provided with an instruction pre-fetch function, for controlling the reading of instructions to be fetched by a CPU, from a memory. The memory control circuit includes a branch-destination buffer for caching a branch-destination instruction and a branch-destination-instruction address when an instruction address output from the CPU becomes inconsecutive due to a branch instruction, and for outputting, when the instruction address output from the CPU matches a cached instruction address, the corresponding branch-destination instruction to the CPU, an address comparison circuit for comparing the branch-destination-instruction address determined by the branch instruction with a branch-source-instruction address, and a buffer-update control circuit for updating data of the branch-destination buffer by the branch-destination instruction only when it is determined according to the result of comparison performed by the address comparison circuit that the instruction address has been changed in the negative direction.

In addition, the present invention provides a microprocessor system provided with a function for pre-fetching an instruction to be sent to a CPU, from a memory. The microprocessor system includes a branch-signal output circuit for outputting a branch signal reporting that the CPU has executed a branch instruction which makes an instruction address inconsecutive, a branch-destination buffer for caching a branch-destination instruction and a branch-destination-instruction address determined by the branch instruction, and for outputting, when the instruction address output from the CPU matches a cached instruction address, the corresponding branch-destination instruction to the CPU, an address comparison circuit for comparing the branch-destination-instruction address determined by the branch instruction which has been executed, with a branch-source-instruction address when the address comparison circuit receives the branch signal, and a buffer-update control circuit for updating data of the branch-destination buffer by the branch-destination instruction only when it is determined according to the result of comparison performed by the address comparison circuit that the instruction address has been changed in the negative direction.

Further, the present invention provides a microprocessor system provided with a function for pre-fetching an instruction to be sent to a CPU, from a memory. The microprocessor system includes a branch-destination buffer for caching a branch-destination instruction and a branch-destination-instruction address when an instruction address output from the CPU becomes inconsecutive due to a branch instruction, and for outputting, when the instruction address output from the CPU matches a cached instruction address, the corresponding branch-destination instruction to the CPU, a subroutine-branch report circuit for outputting a subroutine-branch report signal reporting that the CPU has executed a subroutine call instruction or a subroutine return instruction, an address comparison circuit for comparing the branch-destination-instruction address determined by the branch instruction with a branch-source-instruction address, and a buffer-update control circuit for updating data of the branch-destination buffer by the branch-destination instruction only when it is determined according to the result of comparison performed by the address comparison circuit that the instruction address has been changed in the negative direction, and the subroutine-branch report signal has not been received.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be described below in detail by referring to the drawings.

Figure 1:
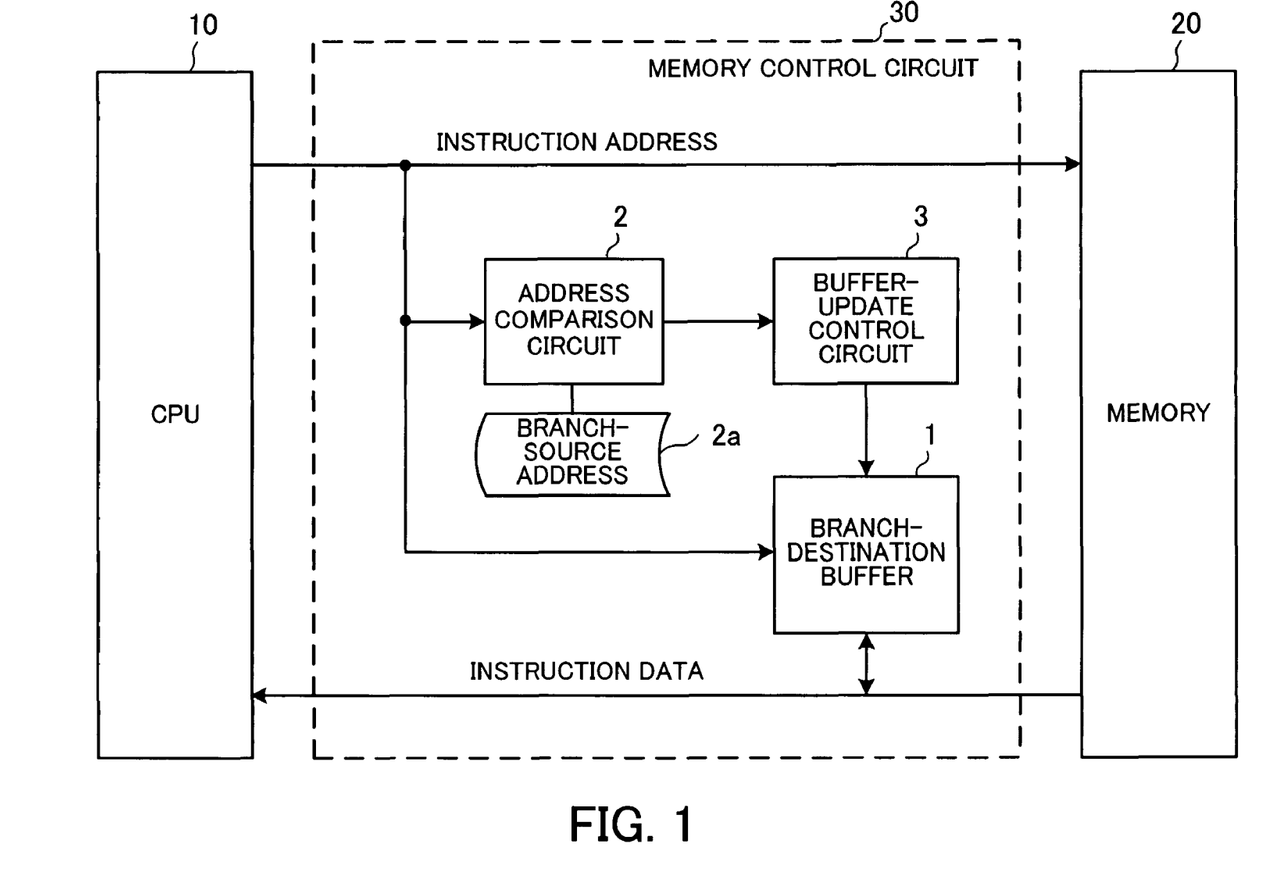
FIG. 1 shows an outline of a microprocessor system according to an embodiment.

FIG. 1 shows an outline of a microprocessor system according to an embodiment of the present invention.

The microprocessor system shown in FIG. 1 employs a pipeline control method, and includes a CPU 10 for fetching instructions and operating according to the instructions, a memory 20 for storing data such as instructions, and a memory control circuit 30 for controlling the reading operations of instructions to be fetched by the CPU 10, from the memory 20.

The CPU 10 includes an instruction fetch processor, a decoder for decoding fetched instructions, and an operation unit for performing various types of operations according to the results of decoding. The CPU 10 performs necessary operations according to the results of decoding of instructions, and also specifies instruction addresses used to read the instructions, to the memory control circuit 30 to obtain the instruction data output accordingly through the memory control circuit 30 and to decode the instruction data.

The memory 20 is a main memory unit for holding instructions and various types of data required for operations. With the memory addresses specified through the memory control circuit 30, the instruction data is read from the memory 20 and sent to the memory control circuit 30. The memory 20 may have one layer or a plurality of layers of cache memories.

The memory control circuit 30 controls the reading operation of instructions to be fetched by the CPU 10, from the memory 20. The memory control circuit 30 is provided with an instruction pre-fetch function (not shown) for reducing the number of accesses to the memory 20 during instruction fetches performed by the CPU 10. The pre-fetch function allows pipeline control.

The memory control circuit 30 further includes a branch-destination buffer 1, an address comparison circuit 2, and a buffer-update control circuit 3, as a function for reducing the number of accesses to the memory 20 during the execution of branch instructions. The branch instructions here mean instructions that cause the instruction address output from the CPU 10 to be changed inconsecutively, and include conditional jump instructions, unconditional jump instructions, subroutine call instructions, subroutine return instructions, and others.

When a branch instruction is executed, the branch-destination buffer 1 caches the instruction (branch-destination instruction) at the branch destination under the control of the buffer-update control circuit 3. Then, when the CPU executes another branch instruction, if the branch-destination-instruction address output from the CPU 10 matches the instruction address held by the branch-destination buffer 1, the corresponding branch-destination instruction is read from the branch-destination buffer 1 and sent to the CPU 10.

The address comparison circuit 2 compares the branch-destination-instruction address specified by a branch instruction, with a branch-source-instruction address, and reports the result of comparison to the buffer-update control circuit 3. The address comparison circuit 2 may hold an instruction address output from the CPU 10 as a branch-source address 2a to compare the instruction address output from the CPU immediately after with the held branch-source address 2a.

The buffer-update control circuit 3 updates the data of the branch-destination buffer 1 by the branch-destination instruction only when the result of comparison performed by the address comparison circuit 2 shows that the instruction address is changed in the negative direction (is reduced) by an instruction branch.

The memory control circuit 30 caches, when an instruction branch occurs, the address of the branch-destination instruction and the instruction data in the branch-destination buffer 1, and uses them when the same branch instruction is executed thereafter. When a simple instruction cache is provided, for example, if the instruction address is changed in the negative direction from that previously used, in a branch or other cases, processing is made faster because the cache is hit. To increase the hit rate, it is necessary to increase the number of entries in the instruction cache, which causes the circuit size and manufacturing cost of the instruction cache to be made larger.

When the branch-destination buffer 1 is provided, which is used only for branch destinations, even if the number of stages of the buffer, which corresponds to the number of entries, is small, the number of times a pre-fetch penalty occurs at an instruction branch is reduced. In this case, however, if the number of stages of the buffer is smaller than the number of branches existing in a loop structure in a program, before the instruction held in the branch-destination buffer 1 is again executed, another branch instruction is executed and the branch-destination buffer 1 is updated. Therefore, the branch-destination buffer 1 is not hit when the previously held branch instruction is again executed. Consequently, even when the branch-destination buffer 1 is provided, if the number of stages of the buffer is small, the buffer contributes a little to the improvement of performance.

To solve this issue, the branch-destination buffer 1 is updated under the control of the buffer-update control circuit 3 in the memory control circuit 30 shown in FIG. 1 only when a branch occurs which changes the instruction address in the negative direction. In general, the branch-destination instructions of branch instructions such as conditional jump instructions existing in a loop are arranged in a memory space having larger instruction addresses than those of the branch instructions in many cases. Therefore, when such branch instructions are executed, the branch-destination buffer 1 is not updated. The branch-destination buffer 1 is likely to continue to hold the instruction executed at the top of the loop. Even if the number of stages in the buffer is small, the hit rate of the branch-destination buffer 1 is increased when a loop is executed, and the penalty-cycle occurrence rate is reduced. Therefore, the performance of processing that uses pipeline control is improved, and at the same time, the circuit size and manufacturing cost are reduced.

A branch to the top of a loop cannot be definitely determined just by an instruction-address change in the negative direction. An instruction-address change in the negative direction occurs also when a subroutine call instruction or a subroutine return instruction is executed. Therefore, the branch-destination buffer 1 may be updated only when the instruction address is changed in the negative direction when a branch instruction is executed, and the difference between the branch-destination-instruction address and the branch-source-instruction address is equal to or smaller than a predetermined reference value. Since subroutine programs are described in general in a memory space away from a main program, if the address difference is large, it can be determined that a subroutine branch occurs, so that the branch-destination buffer 1 is not updated.

Alternatively, the CPU 10 may output a subroutine-branch branch report signal indicating that a decoded instruction is a subroutine call instruction or a subroutine return instruction, such that the buffer-update control circuit 3 does not update the buffer when a subroutine branch occurs, according to the subroutine-branch report signal.

Specific example structures of the above-described microprocessor system will be described next.

First Embodiment

Figure 2:
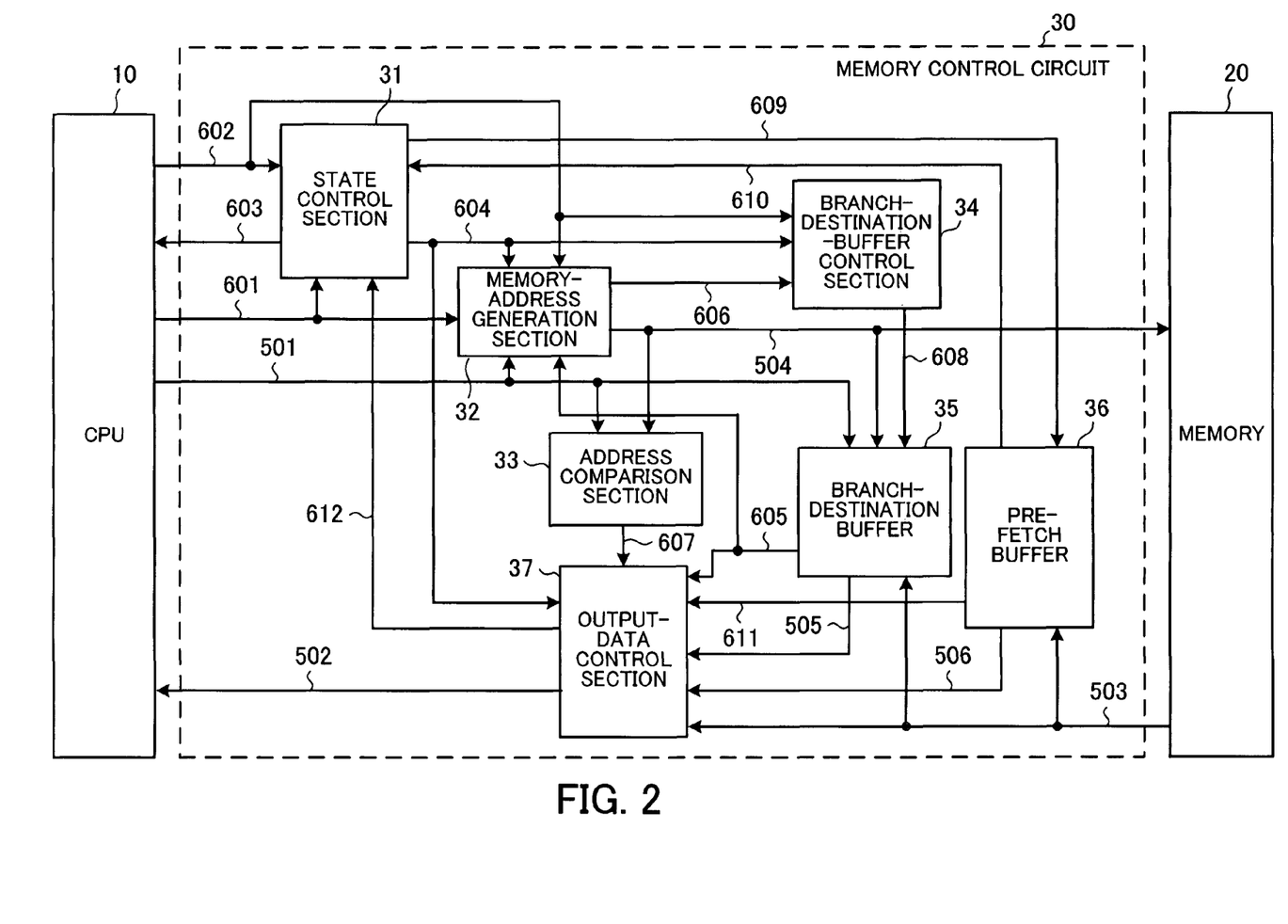
FIG. 2 shows the structure of a main part of a microprocessor system according to a first embodiment.

FIG. 2 shows the structure of a main part of a microprocessor system according to a first embodiment of the present invention.

The microprocessor system shown in FIG. 2 is applied to a so-called single-chip microcontroller and others. In this system, an access to a memory 20 needs the period of two cycles of a CPU clock signal. The width of a bus used for the data access is set two times wider than that for instruction code and an instruction-data pre-fetch function is used, so that an instruction can be sent to a CPU 10 in one cycle. It is assumed here as an example case that buses for instruction addresses and instruction data are 32 bits wide, instruction data is 16 bits wide, the CPU 10 can fetch two instructions at the same time once in two cycles of the CPU clock signal, and an access cycle for the memory 20 corresponds to two cycles of the CPU clock signal.

In this microprocessor system, the CPU 10 outputs the instruction address 501 of an instruction to be fetched, and an access control signal 601 indicating an access state at an instruction fetch to request a memory control circuit 30 to fetch the instruction, and obtains instruction data 502. When a usual instruction is executed, the CPU 10 sequentially increases the instruction address 501 to fetch the instruction. When the instruction address 501 is changed inconsecutively, a branch signal 602 is asserted and output to the memory control circuit 30. While a wait signal 603 sent from the memory control circuit 30 is asserted, the CPU 10 stops an instruction-fetch request.

In response to an instruction fetch request caused by the instruction address 501, the access control signal 601, and the branch signal 602 sent from the CPU 10, the memory control circuit 30 reads data (memory data 503) from the memory 20 corresponding to the instruction address 501, and outputs it as the instruction data 502 to the CPU 10. The memory control circuit 30 has a pre-fetch function for starting an access to the memory 20 to obtain the memory data 503 to be requested next, before the CPU 10 sends a request, and a function for caching the branch-destination instruction and address specified by a branch instruction.

The memory control circuit 30 includes a state control section 31, a memory-address generation section 32, an address comparison section 33, a branch-destination-buffer control section 34, a branch-destination buffer 35, a pre-fetch buffer 56, and an output-data control section 37.

The state control section 31 collectively controls the whole part of the memory control circuit 30, and outputs various control signals, described later, to the branch-destination-buffer control section 34, the pre-fetch buffer 36, and the output-data control section 37 according to signals sent from sections in the memory control circuit 30.

The memory-address generation section 32 generates an address signal (memory address 504) for an access to the memory 20 according to the instruction address 501 sent from the CPU 10 in response to the state determined by the access control signal 601 and the branch signal 602 sent from the CPU 10, a memory-state signal 604 sent from the state control section 31, and a branch-destination-buffer hit signal 605 sent from the branch-destination buffer 35. The memory-address generation section 32 also outputs an instruction-address latch signal 606 obtained by latching the output memory address 504 by the CPU clock signal, to the branch-destination-buffer control section 34.

The address comparison section 33 compares the instruction address 501 sent from the CPU 10 with the memory address 504 generated by the memory-address generation section 32, and outputs a pre-fetch hit signal 607 to the output-data control section 37 when the addresses match.

The branch-destination-buffer control section 34 determines whether a branch which causes the address to be changed in the negative direction has occurred, according to the branch signal 602 sent from the CPU 10, the memory-state signal 604 sent from the state control section 31, and the instruction-address latch signal 606 sent from the memory-address generation section 32. When a branch which causes the address to be changed in the negative direction has occurred, the branch-destination-buffer control section 34 asserts a branch-destination-buffer update signal 608 sent to the branch-destination buffer 35.

When the branch-destination-buffer control section 34 asserts the branch-destination-buffer update signal 608, the branch-destination buffer 35 receives the memory address 504 output from the memory-address generation section 32 and instruction data (memory data 503) read from the memory 20 according to the memory address 504, and updates stored data. When the memory address 504 sent from the memory-address generation section 32 matches the memory address stored in the branch-destination buffer 35, the branch-destination buffer 35 asserts the branch-destination-buffer hit signal 605, and outputs the instruction data (branch-destination-buffer data 505) corresponding to the memory address to the output-data control section 37.

The pre-fetch buffer 36 reads the memory data 503 output from the memory 20 by a pre-fetch in response to a pre-fetch-buffer control signal 609 sent from the state control section 31. When the pre-fetch buffer 36 is full of data, the pre-fetch buffer 36 asserts a pre-fetch-buffer state signal 610 sent to the state control section 31. With the use of this signal, only when the pre-fetch buffer 36 is not full of data, the state control section 31 uses the memory state signal 604 to make the memory-address generation section 32 increment the memory address 504 and asserts the pre-fetch-buffer control signal 609 to make the pre-fetch buffer 36 execute a pre-fetch, before a request sent from the CPU 10.

When the pre-fetch buffer 36 holds the instruction data corresponding to the instruction address 501 specified by the CPU 10, the pre-fetch buffer 36 asserts a pre-fetch-buffer hit signal 611 sent to the output-data control section 37, and outputs the instruction data (pre-fetch-buffer data 506) to the output-data control section 37.

The output-data control section 37 selects the data corresponding to a signal asserted among the pre-fetch hit signal 607 sent from the address comparison section 33, the branch-destination-buffer hit signal 605 sent from the branch-destination buffer 35, and the pre-fetch-buffer hit signal 611 sent from the pre-fetch buffer 36. When the pre-fetch hit signal 607 is asserted, the output-data control section 37 outputs the memory data 503 as the instruction data 502 to the CPU 10 at timing when the memory data 503 is output from the memory 20, according to the memory state signal 604 sent from the state control section 31. When the branch-destination-buffer hit signal 605 or the pre-fetch-buffer hit signal 611 are asserted, the output-data control section 37 outputs the hit data (the branch-destination-buffer data 505 or the pre-fetch-buffer data 506) as the instruction data 502 to the CPU 10 at timing when the signal is asserted.

When one of these signals is asserted, the output-data control section 37 asserts a data match signal 612 sent to the state control section 31 to prevent the wait signal 603 from being output from the state control section 31 to the CPU 10. When the state control section 31 receives an instruction-fetch request from the CPU 10, if none of the memory data 503, the branch-destination-buffer data 505, and the pre-fetch-buffer data 506 is hit, the state control section 31 asserts the wait signal 603 sent to the CPU 10 to stop the instruction-fetch request sent from the CPU 10.

With the above-described structure, instruction data stored in the memory 20 is read in advance and sent to the CPU 10 to perform pipeline control under the control of the memory control circuit 30 in the microprocessor system. The branch-destination buffer 35 caches the branch-destination instruction data and address specified by a branch instruction to reduce the penalty-cycle occurrence rate in a case when an instruction branch occurs.

When the instruction address 501 sent from the CPU 10 is not monotonously increased, but changed inconsecutively, the branch signal 602 sent from the CPU 10 is asserted to report to the memory control circuit 30 that the current instruction address 501 is for the branch destination. Instructions which generate such a branch include conditional jump instructions, unconditional jump instructions, subroutine call instructions, subroutine return instructions, and others.

The CPU 10 outputs the branch-destination-instruction address 501 as well as the asserted branch signal 602. When the instruction address 501 matches an address cached by the branch-destination buffer 35, the branch-destination buffer 35 asserts the branch-destination-buffer hit signal 605, and outputs the instruction data corresponding to the hit address to the CPU 10 through the output-data control section 37. At the same time, an access to the memory 20 for pre-fetching the instruction to be executed next is started.

When the branch signal 602 is asserted, if the branch-destination-buffer hit signal 605 is not asserted, namely, if stored data has not been hit, the state control section 31 asserts the wait signal 603 sent to the CPU 10 until the data fetch of the branch-destination address from the memory 20 is finished, to stop an instruction supply to the CPU 10. A period when a branch-destination instruction is read from the memory 20 in this way is a penalty cycle.

When the branch-destination buffer 35 is not hit, the penalty-cycle occurrence rate is further reduced under the control of the branch-destination-buffer control section 34 in the following way. The branch-destination-buffer control section 34 receives the instruction-address-latch signal 606 from the memory-address generation section 32, compares the branch-source address with the branch-destination address according to the signal value of the instruction-address latch signal 606, and asserts the branch-destination-buffer update signal 608 sent to the branch-destination buffer 35 to update the data only when the address is changed in the negative direction. With this operation, especially when a loop is included in a program, the hit rate is increased.

Figure 3:
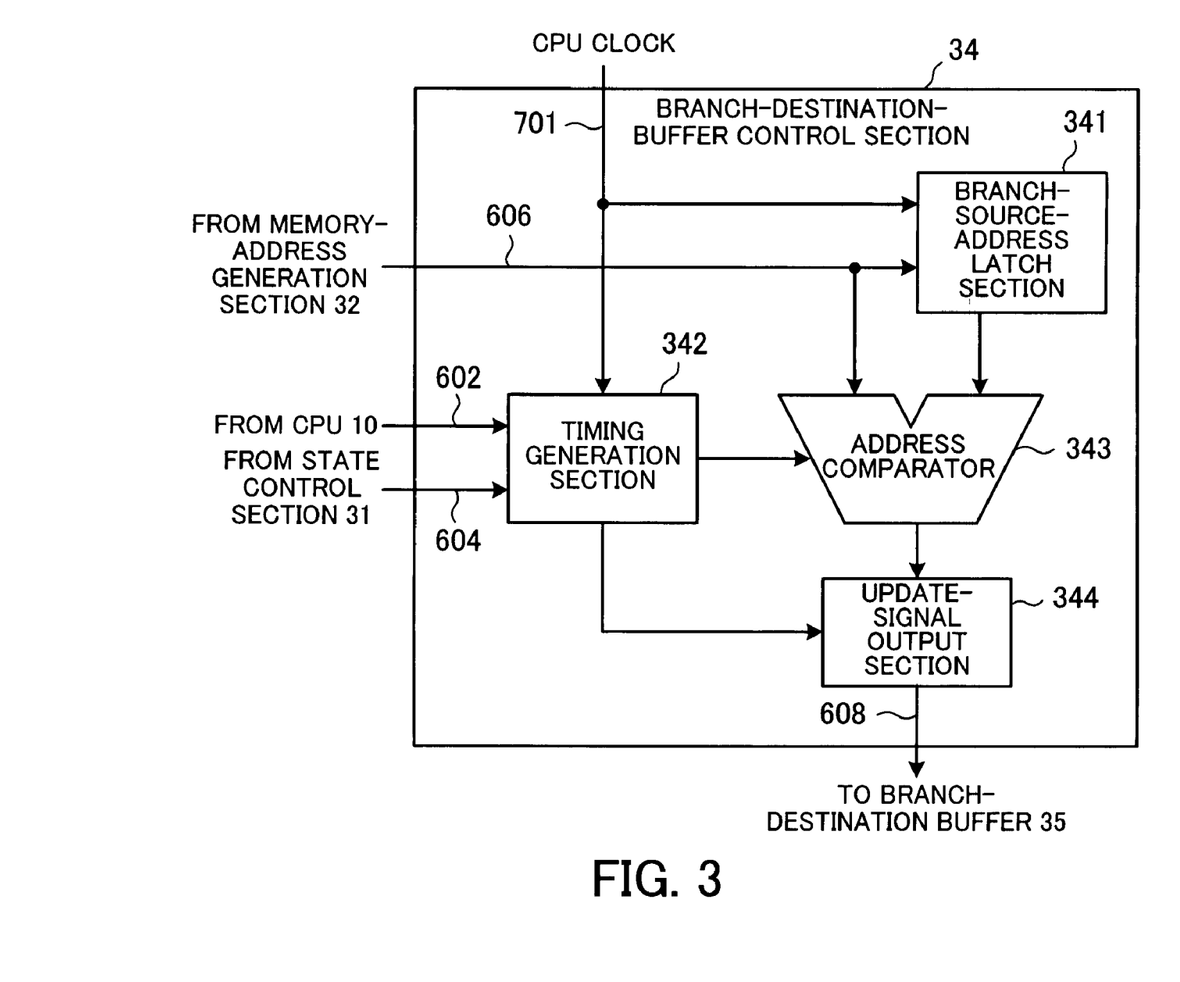
FIG. 3 shows the internal structure of a branch-destination-buffer control section according to the first embodiment.

FIG. 3 shows the internal structure of the branch-destination-buffer control section 34 according to the first embodiment.

As shown in FIG. 3, the branch-destination-buffer control section 34 includes a branch-source-address latch section 341, a timing generation section 342, an address comparator 343, and an update-signal output section 344.

The branch-source-address latch section 341 latches the instruction-address-latch signal 606 sent from the memory-address generation section 32 at the input timing of a CPU clock signal 701, and outputs the latched value to the address comparator 343. In other words, the branch-source-address latch section 341 always holds the instruction address 510 sent from the CPU 10 at the immediately previous clock cycle, and sends it to the address comparator 343.

The timing control section 342 controls the operation timing of the address comparator 343 and the update-signal output section 344. Specifically, the timing control section 342 makes the address comparator 343 execute an operation when the branch signal 602 sent from the CPU 10 is asserted, and then, gives operation-start timing to the update-signal output section 344 when the memory state signal 604 sent from the state control section 31 indicates data reading from the memory 20 at a subsequent input timing of the CPU clock signal 701.

The address comparator 343 subtracts the value input from the branch-source-address latch section 341 from the value of the instruction-address-latch signal 606 sent from the memory-address generation section 32 according to the timing control made by the timing control section 342, and, when the difference becomes smaller than zero, reports this state to the update-signal output section 344. Since the address comparator 343 executes an operation only when the branch signal 602 is asserted, the power consumption of the circuit is reduced. The address comparator 343 may be a circuit which just compares input addresses in magnitude.

When the update-signal output section 344 receives a report from the address comparator 343, indicating that the address difference is smaller than zero, it determines that the instruction address 501 has been changed in the negative direction, and sets a branch-buffer update flag serving as internal data. When the timing control section 342 gives the update-signal output section 344 the operation timing, the update-signal output section 344 outputs the branch-destination-buffer update signal 608 corresponding to the value of the branch-buffer update flag to the branch-destination buffer 35.

In the branch-destination-buffer control section 34, when the branch signal 602 sent from the CPU 10 is asserted, the address comparator 343 receives the branch-destination-instruction address sent from the memory-address generation section 32 and the branch-source-instruction address sent from the branch-source-address latch section 341. The address comparator 343 obtains the address difference between them, and, when the address is changed in the negative direction, reports the state to the update-signal output section 344. The update-signal output section 344 asserts the branch-destination-buffer update signal 608 at the next data reading timing from the memory 20 to update the data in the branch-destination buffer 35.

A specific example processing flow will be shown and the operation of the microprocessor system will be described in detail.

Figure 4:
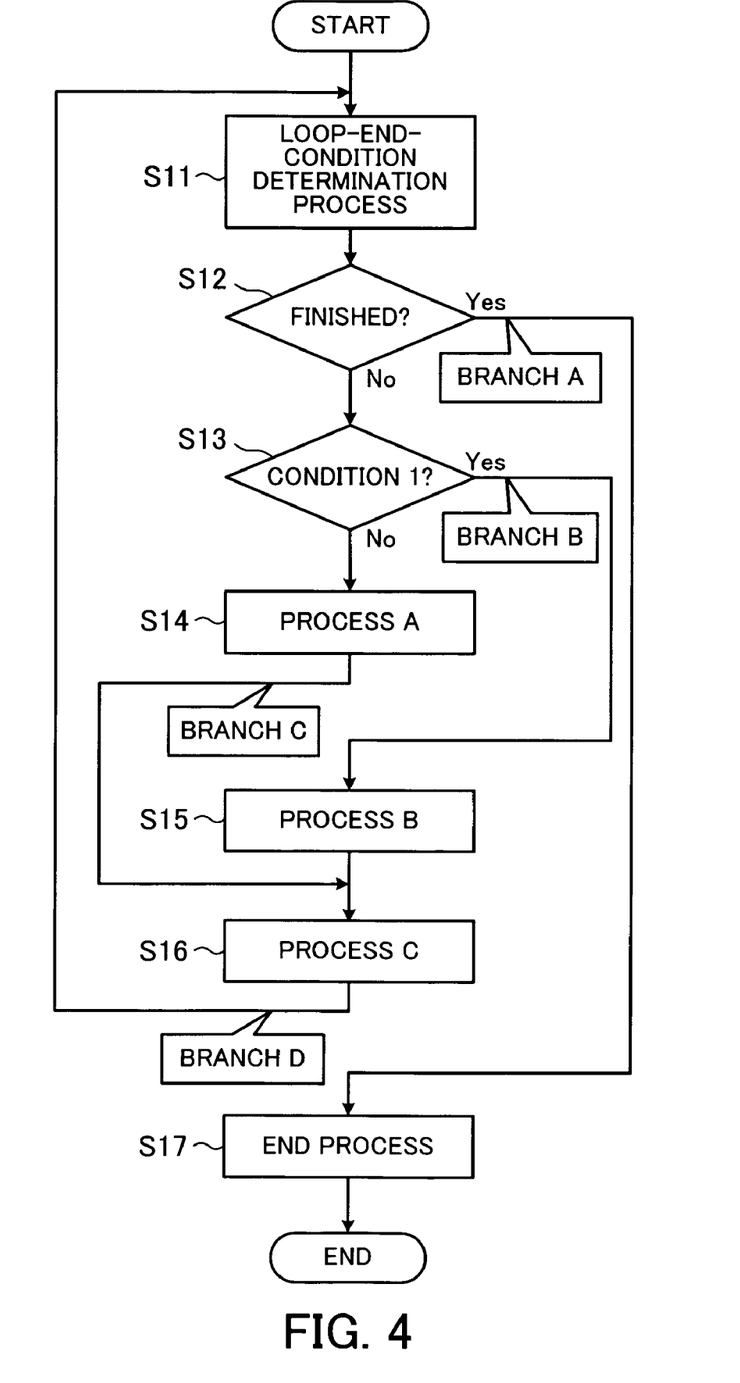
FIG. 4 is a flowchart showing an example program in which a conditional jump is included in a loop.

FIG. 4 is a flowchart showing an example program in which conditional jump instructions are included in a loop.

In FIG. 4, it is assumed that process codes in steps S11 to S17 are stored in that order in a memory space consecutive viewed from the CPU 10. A branch to step S17 at a conditional jump in step S12 is called a "branch A", a branch to step S15 at a conditional jump in step S13 is called a "branch B", an unconditional jump from step S14 to step S16 is called a "branch C", and an unconditional jump from step S16 to step S11 is called a "branch D". Among the branches, only the "branch D" makes the instruction address 501 changed in the negative direction.

To make clear a difference with the present embodiment, a conventional case in which the branch-destination destination buffer 35 is updated every time a branch instruction occurs (namely, the branch signal is asserted) will be described.

Figure 5:
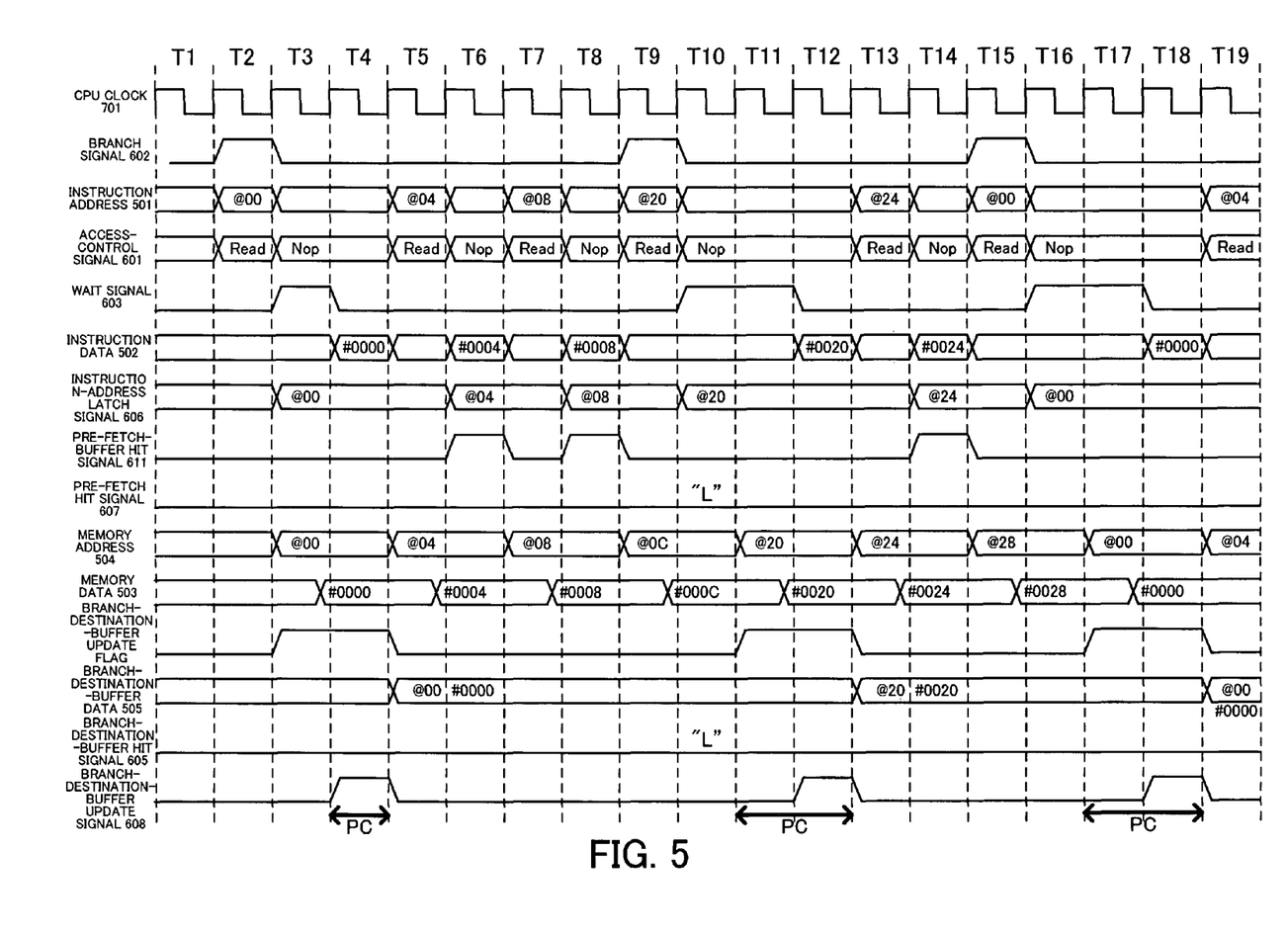
FIG. 5 is a timing chart indicating the operation performed when the program shown in FIG. 4 is executed, in a conventional case.

FIG. 5 is a timing chart showing the operation in the conventional case, performed when the above program is executed.

Assuming, for example, that the branch-destination buffer 35 has one stage of entry, when a loop from step S11 to step S16 is repeated in FIG. 4, the "branch B" or the "branch C", and the "branch D" alternatively occur. In this case, the branch-destination buffer 35 is updated at each of the branches described above by a branch-destination instruction, and there occurs no hit in the conventional case.

FIG. 5 shows the operation performed when the program is executed in the order of steps S11, S12, S13, S15, S16, and S11. The CPU requests fetches at clock states T2, T5, T7, and T9 in order to execute steps S11, S12, S13, and S15, respectively. When an instruction fetch is performed in step S15 after the "branch B" was performed, since data stored in the branch-destination buffer 35 and the pre-fetch buffer 36 is not hit, an instruction (memory data 503) is read from the memory 20, and clock states T11 and T12 used for the reading operation serve as penalty cycles PC. The branch-destination buffer 35 is updated by a fetched branch-destination instruction corresponding to step S15 (at clock state T13).

Then, the CPU requests fetches at clock states T13 and T15 in order to execute steps S16 and S11, respectively. When an instruction fetch is performed in step S11 after the "branch D" was performed, since data stored in the branch-destination buffer 35 is not hit, an instruction is read from the memory 20, and clock states T17 and T18 serve as penalty cycles PC. The branch-destination buffer 35 is updated during this period.

When the data of the branch-destination buffer 35 is updated every time a branch occurs, in this way, since the branch-destination buffer 35 holds the branch-destination instruction specified by the "branch B" or the "branch C" when step S11, which is the branch destination of the "branch D", is executed again, no hit occurs. To increase the hit rate of the branch-destination buffer 35 at the "branch D", it is necessary to provide the number of stages of the buffer equal to or larger than the number of branches in the loop.

Figure 6:
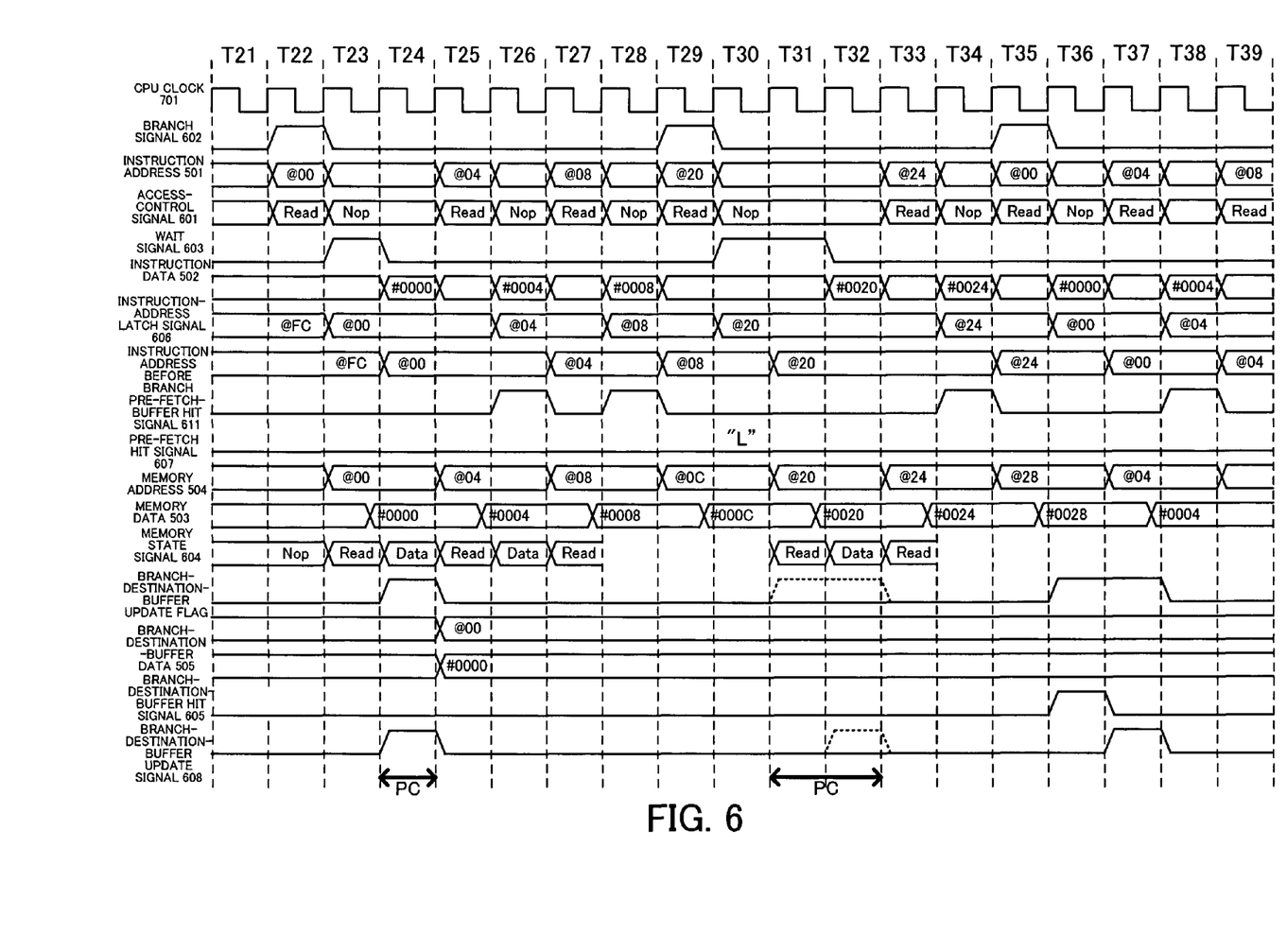
FIG. 6 is a timing chart indicating the operation performed when the program shown in FIG. 4 is executed, in the first embodiment.

FIG. 6 is a timing chart showing the operation performed in the present embodiment.

FIG. 6 shows the operation performed when the program is executed in the same step order as that in FIG. 5. In FIG. 6, when the CPU requests an instruction fetch at clock state T29 in step S15 after the "branch B" was performed, the address comparator 343 of the branch-destination-buffer control section 34 performs an operation to obtain the difference between the branch-source address (08) and the branch-destination address (20) at clock state T30, immediately after T29. Since it is determined from the result of the operation that the branch has changed the address in the positive direction, the update-signal output section 344 does not assert the branch-destination-buffer update signal 608, so that the branch-destination buffer 35 is not updated. Therefore, the branch-destination buffer 35 holds the instruction and address corresponding to step S11.

Then, when the "branch D" occurs and a branch-destination instruction fetch is requested (at clock state T36), the branch-destination buffer 35 is hit, the branch-destination-buffer hit signal 605 is asserted, and the data stored in the branch-destination buffer 35 is sent to the CPU 10 as instruction data 502. Consequently, no penalty cycle occurs.

At clock state T37, immediately after the fetch request, the address comparator 343 of the branch-destination-buffer control section 34 performs an operation to obtain the difference between the branch-source address (24) and the branch-destination address (00). It is determined from the result of the operation that the branch changes the instruction address 501 in the negative direction, and the update-signal output section 344 asserts the branch-destination-buffer update signal 608. However, the branch-destination buffer 35 already holds the same branch-destination instruction, it is not necessary to update the data.

As described above, under the control of the branch-destination-buffer control section 34, the branch-destination buffer 35 is updated only when a branch which changes the instruction address 501 in the negative direction occurs. Therefore, especially when a program having a loop is executed, even if the branch-destination buffer 35 has a small number of buffer stages, the branch-destination buffer 35 still has, at a high possibility, the instruction used at the top of the loop when the processing returns to the top of the loop. Consequently, the hit rate of the branch-destination buffer 35 is increased, and the processing performance of pipeline control is further improved without increasing the circuit size and manufacturing cost.

To determine whether the branch-destination buffer 35 is to be updated, the branch-destination-buffer control section 34 uses the address comparator (or a subtraction circuit). Therefore, the circuit structure becomes simpler and the circuit size and manufacturing cost become smaller than when a method is used in which a counter counts the number of possible entries in a buffer to determine whether the buffer is to be updated. As a result, the performance of processing using pipeline control is improved, and at the same time, the circuit size and manufacturing cost are reduced.

Second Embodiment

When it is only determined whether a branch-destination-instruction address is smaller than the previous-instruction address, as in the first embodiment, if a subroutine or an interrupt process is included in a loop, for example, it is not possible to determine whether the branch is a branch to the top of the loop of the program, which is the target to detect, or the branch is a branch caused by a subroutine call instruction or return instruction.

Figure 7:
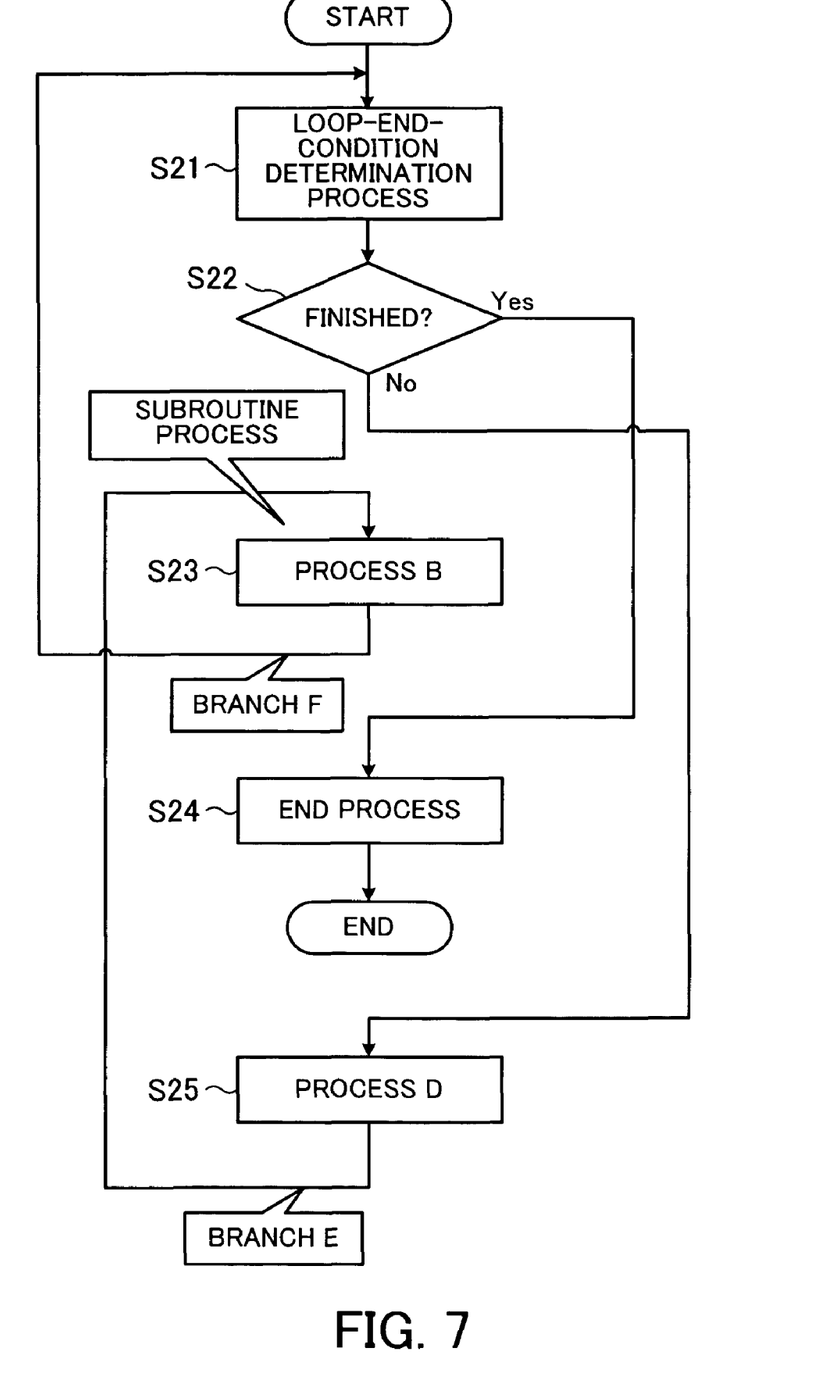
FIG. 7 is a flowchart showing an example program in which a subroutine process is included in a loop.

FIG. 7 is a flowchart showing an example program in which a subroutine process is included in a loop.

In FIG. 7, it is assumed that process codes in steps S21 to S23 are stored in that order in a memory space consecutive viewed from the CPU 10 as in FIG. 4. Step 23 performs a subroutine process.

In this figure, a "branch E" from step S25 to step S23 and a "branch F" from step S23 to step S21 both change the instruction address 501 in the negative direction. Therefore, the branch-destination buffer 35 is updated when the "branch E" or the "branch F" occurs in the first embodiment. When the processing returns to the top (step S21) of the loop by the "branch F", the branch-destination buffer 35 has been updated to the instruction corresponding to step S23, and is not hit.

When a subroutine process is included, wherever the program steps corresponding to the subroutine process are located, either a branch (call instruction) to the subroutine process or a branch (return instruction) from the subroutine process is a branch which causes the address to be changed in the negative direction. Therefore, the branch-destination buffer 35 is always not hit when a branch to the top of the loop occurs, which reduces the processing speed.

To solve this issue, in the second embodiment, when a branch which causes the instruction address 501 to be changed in the negative direction occurs, only if the difference between the branch-source-instruction address and the branch-destination-instruction address is equal to or smaller than a predetermined value, the branch-destination destination buffer 35 is updated.

Figure 8:
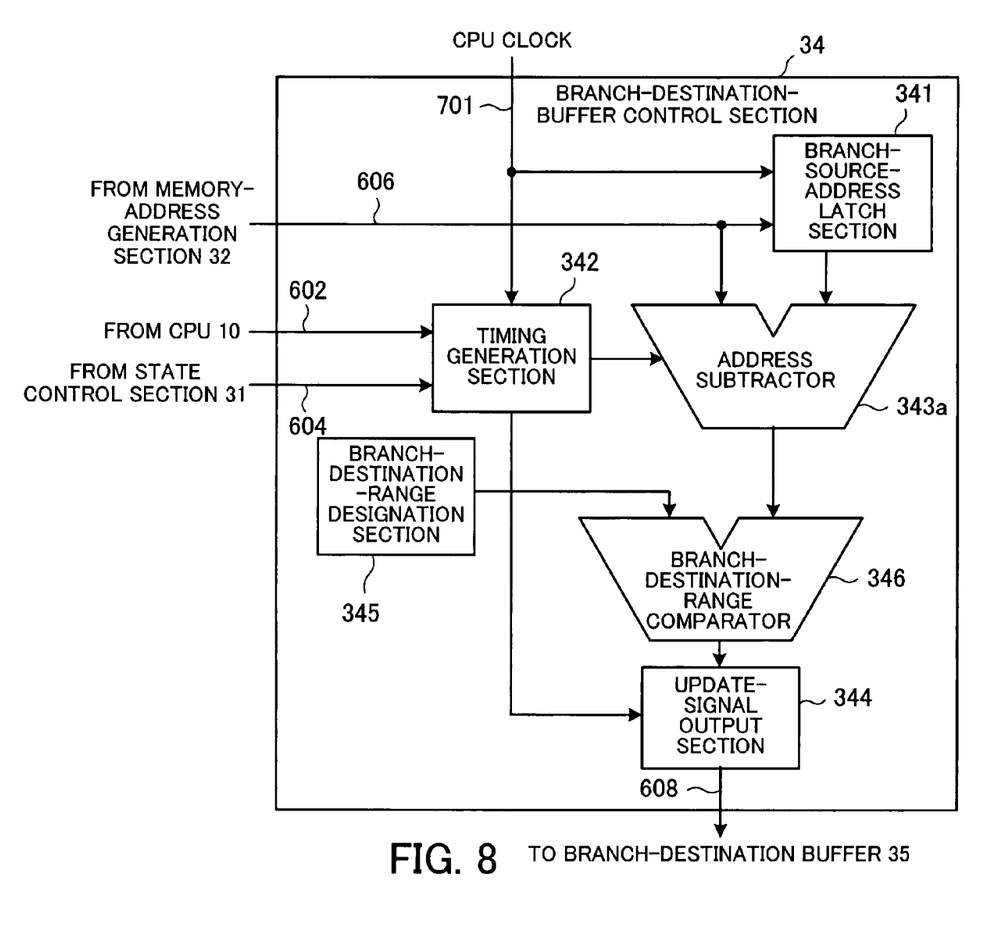
FIG. 8 shows the internal structure of a branch-destination-buffer control section according to a second embodiment.

FIG. 8 shows the internal structure of a branch-destination-buffer on-buffer control section 34 according to a second embodiment. In FIG. 8, the same reference symbols as those used in FIG. 3 are assigned to the same sections as those shown in FIG. 3, and a description thereof is omitted.

The branch-destination-buffer control section 34 shown in FIG. 8 includes a branch-destination-range designation section 345 and a branch-destination-range comparator 346 in addition to the structure of the first embodiment, and has an address subtractor 343a for subtracting the address sent from the branch-source-address latch section 341 from the instruction-address latch signal 606 sent from the memory-address generation section 32, instead of the address comparator 343.

The branch-destination-range designation section 345 specifies a reference value used for determining according to the result of operation performed by the address subtractor 343a whether a branch to the top of a loop occurs. The branch-destination-range comparator 346 compares the absolute value of the difference obtained by the address subtractor 343a with the reference value sent from the branch-destination-range designation section 345, and, when the absolute value is equal to or smaller than the reference value and the input difference is smaller than zero, the branch-destination-range comparator 346 determines that a branch to the top of the loop has occurred and reports the state to the update-signal output section 344. When the update-signal output section 344 receives the report indicating that a branch to the top of the loop has occurred, the update-signal output section 344 asserts the branch-destination-buffer update signal 608 sent to the branch-destination buffer 35 to update the branch-destination buffer 35. With these operations, when the address is changed in the negative direction and the change is equal to or smaller than the reference value, the branch-destination buffer 35 is updated.

Subroutine programs located at the branch destinations of subroutine call instructions are provided as libraries separately from a main program at a memory space away from the addresses of instructions in the main program in many cases. Alternatively, when the user makes a subroutine program, the subroutine program is disposed in a memory space away from the corresponding subroutine call instruction in many cases.

When a loop structure is described by a programming language such as the C language, descriptions in the loop are reduced, a function (subroutine) is prepared for each complicated process, and necessary functions are called from the loop in many cases to make the source program easier to read. Therefore, the loop has a relatively small number of steps.

With these characteristics taken into account, when the reference value output from the branch-destination-range designation section 345 is set to an appropriate value, it is possible to determine whether a branch which causes the instruction address to be changed in the negative direction is a subroutine call instruction or a subroutine return instruction, or not. Therefore, a subroutine branch does not cause the branch-destination buffer 35 to be updated, and only the instruction at the top of a loop is cached in the branch-destination buffer 35. consequently, the penalty-cycle occurrence rate is reduced in a loop process to make the entire processing faster without increasing the number of stages in the buffer, which increases the circuit size and manufacturing cost.

Third Embodiment

Figure 9:
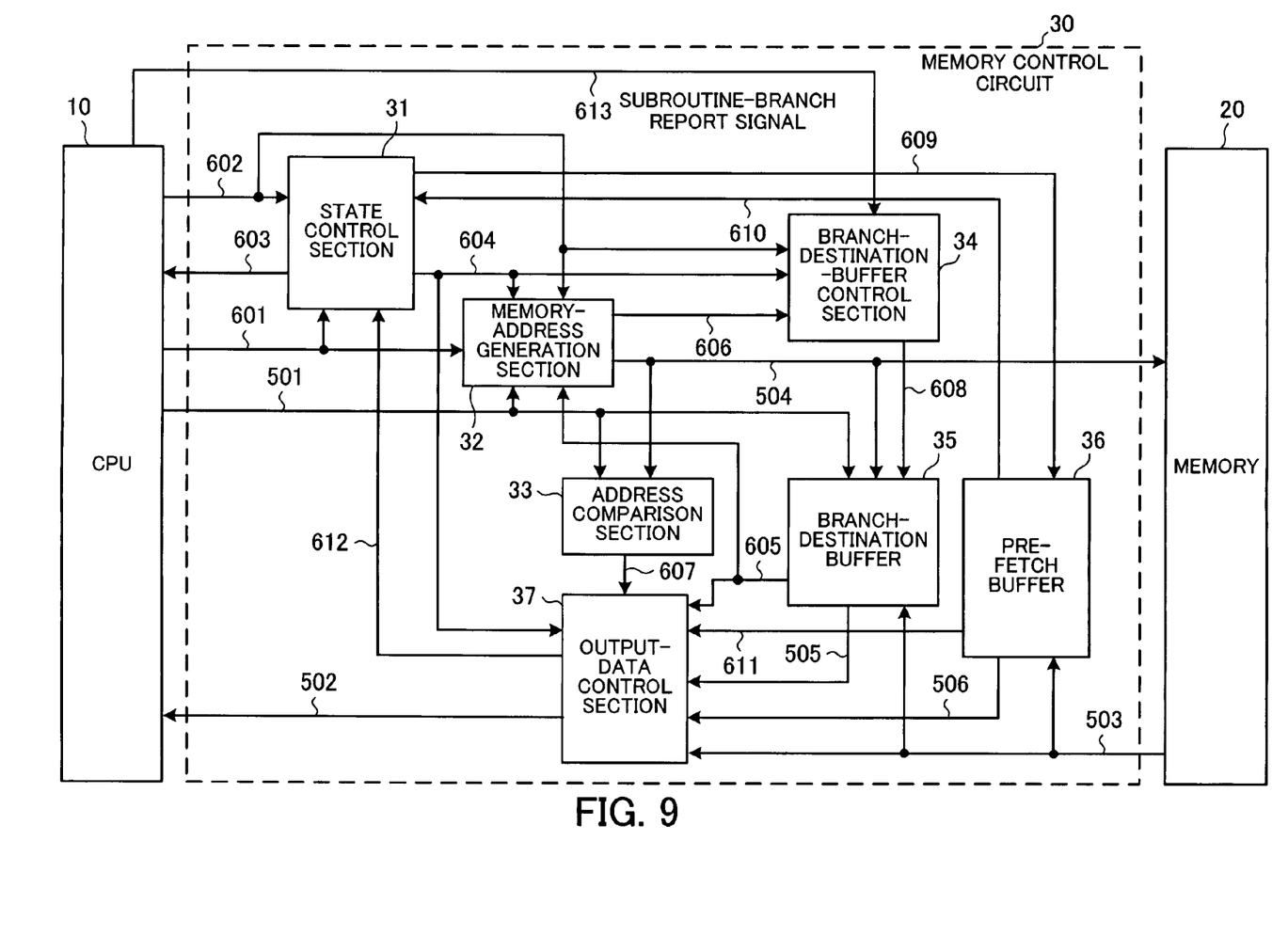
FIG. 9 shows the structure of a microprocessor system according to a third embodiment.

FIG. 9 shows the structure of a microprocessor system according to a third embodiment. In FIG. 9, the same reference symbols as those used in FIG. 2 are assigned to the same sections as those shown in FIG. 2, and a description thereof is omitted.

In the second embodiment, the branch-destination-buffer control section 34 determines whether a subroutine branch has occurred. In the present embodiment, whether a subroutine branch has occurred is determined by a subroutine-branch report signal 613 sent from a CPU 10. When the CPU 10 decodes a subroutine call instruction or a subroutine return instruction, the CPU 10 asserts the subroutine-branch report signal 613 to report to a branch-destination-buffer control section 34 of a memory control circuit 30 that a subroutine branch has occurred.

Figure 10:
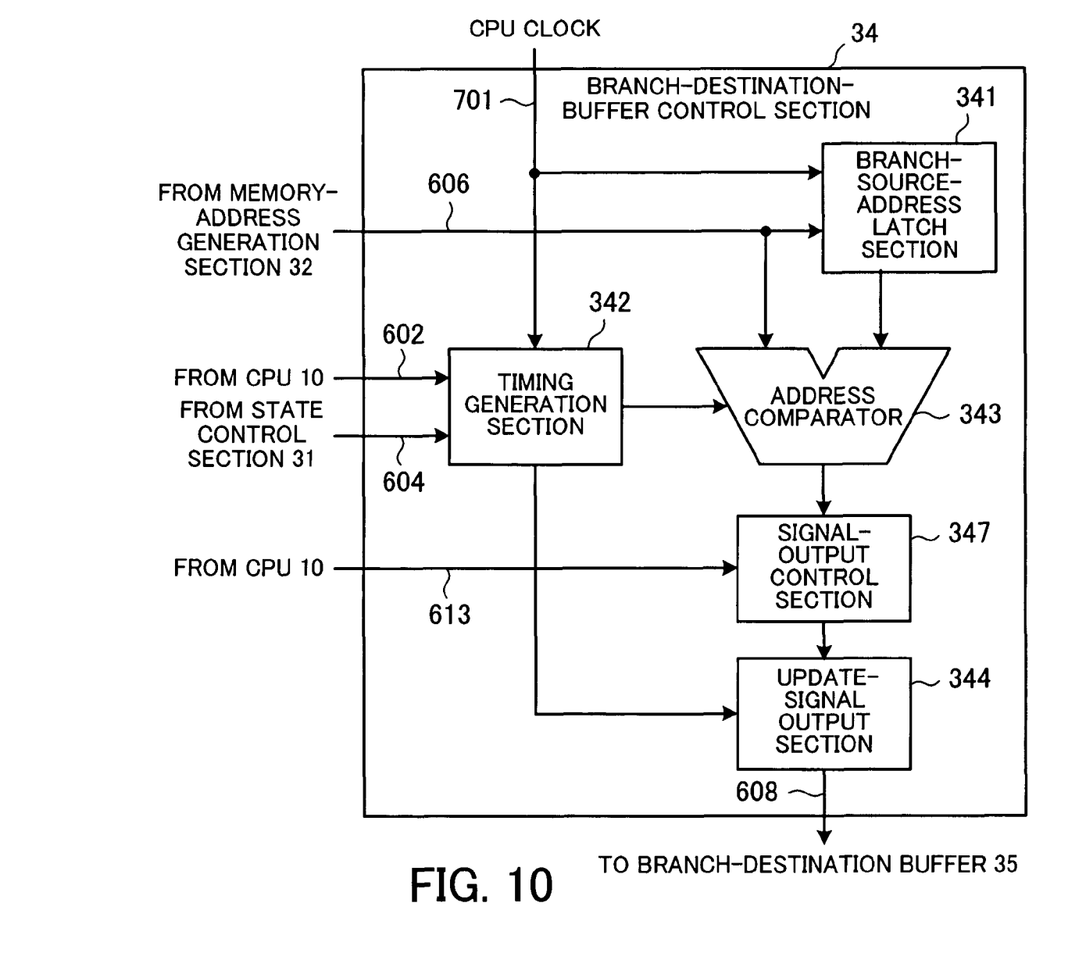
FIG. 10 shows the internal structure of a branch-destination-buffer control section according to the third embodiment.

FIG. 10 shows the internal structure of the branch-destination-buffer control section 34 according to a third embodiment. In FIG. 10, the same reference symbols as those used in FIG. 3 are assigned to the same sections as those shown in FIG. 3, and a description thereof is omitted.

The branch-destination-buffer control section 34 shown in FIG. 10 includes a signal-output control section 347 in addition to the structure of the first embodiment. When it is determined according to the result of operation performed by an address comparator 343 that a branch which causes the instruction address 501 to be changed in the negative direction occurs, a signal indicating this state is output to an update-signal output section 344 through a signal-output control section 347. When the subroutine-branch report signal 613 sent from the CPU 10 is asserted, however, the signal-output control section 347 prevents the signal indicating the state from being output to the update-signal output section 344. With this operation, the branch-destination buffer 35 is always not updated when a subroutine branch occurs. Consequently, the penalty-cycle occurrence rate is further reduced in a loop process without increasing the number of stages in the buffer, which increases the circuit size and manufacturing cost.

According to the present invention, only when the instruction address has been changed in the negative direction by a instruction branch, data of a branch-destination buffer is updated by the branch-destination instruction under the control of a buffer-update control circuit. Therefore, even if the branch-destination buffer has a small number of buffer stages, the branch-destination buffer has a high probability at which the instruction at the top of a loop in a program is cached, and the branch-penalty occurrence rate is reduced during the execution of the loop steps. Consequently, the performance of processing which employs pipeline control is improved without increasing the circuit size.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A memory control circuit provided with an instruction pre-fetch function, for controlling the reading of instructions to be fetched by a CPU (Central Processing Unit), from a memory, comprising:
    a branch-destination buffer for caching a branch-destination instruction and a branch-destination-instruction address when an instruction address output from the CPU becomes inconsecutive to one another due to a branch instruction, and for outputting, when the instruction address output from the CPU matches a cached instruction address, the corresponding branch-destination instruction to the CPU;
    an address comparison circuit for comparing the branch-destination-instruction address determined by the branch instruction with a branch-source-instruction address;
    a difference comparison circuit for comparing the difference between a plurality of bits of the branch-source-instruction address and a plurality of bits of the branch-destination-instruction address determined by the branch instruction with a predetermined reference value; and
    a buffer-update control circuit for updating data of the branch-destination buffer by the branch-destination instruction only when it is determined according to the result of comparison performed by the address comparison circuit that the branch-destination-instruction address is in a negative direction from the branch-source-instruction address and the difference comparison circuit determines that the difference is equal to or smaller than the reference value;
    wherein, when the address comparison circuit receives a branch signal reporting that the instruction address output from the CPU has become inconsecutive to one another, from the CPU, the address comparison circuit compares the branch-destination-instruction address determined by the branch instruction with the branch-source-instruction address.

2. The memory control circuit according to claim 1, further comprising an address hold circuit, when the renewed instruction address is output from the CPU, the address hold circuit holding the immediately preceding instruction address is output from the CPU;
    wherein, when the address comparison circuit receives the branch signal, the address comparison circuit compares the branch-destination-instruction address output from the CPU with the instruction address held by the address hold circuit.

3. A microprocessor system provided with a function for pre-fetching an instruction to be sent to a CPU, from a memory, comprising:
    a branch-signal output circuit for outputting a branch signal reporting that the CPU has executed a branch instruction which makes an instruction address inconsecutive to one another;
    a branch-destination buffer for caching a branch-destination instruction and a branch-destination-instruction address determined by the branch instruction, and for outputting, when the instruction address output from the CPU matches a cached instruction address, the corresponding branch-destination instruction to the CPU;
    an address comparison circuit for comparing the branch-destination-instruction address determined by the branch instruction which has been executed, with a branch-source-instruction address when the address comparison circuit receives the branch signal;
    a difference comparison circuit for comparing the difference between a plurality of bits of the branch-source-instruction address and a plurality of bits of the branch-destination-instruction address determined by the branch instruction with a predetermined reference value; and
    a buffer-update control circuit for updating data of the branch-destination buffer by the branch-destination instruction only when it is determined according to the result of comparison performed by the address comparison circuit that the branch-destination-instruction address is in a negative direction from the branch-source-instruction address and the difference comparison circuit determines that the difference is equal to or smaller than the reference value.

4. A microprocessor system provided with a function for pre-fetching an instruction to be sent to a CPU, comprising:
    a buffer-update control circuit to load a branch-destination-instructions following a branch-source-instruction, in a branch-destination buffer, only when a branch-destination-instruction address is in a negative direction from a branch-source-instruction address, and a difference not indicating a subroutine branch between a plurality of bits of the branch-source-instruction address and a plurality of bits of the branch-destination-instruction address is equal to or smaller than a reference value.

5. A method, comprising:

comparing, by a processor, a branch destination address provided by a branch instruction with a branch source address and caching a branch destination instruction in a buffer when the branch source address and branch destination address are inconsecutive;

comparing, by the processor, a distance between the branch source address and the branch destination address with a reference value by comparing a difference between a plurality of bits of the branch source address and a plurality of bits of the branch destination address; and loading, by the processor, the cached branch destination instruction from the buffer when the distance of the branch destination address to the branch source address is negative and less than or equal to the reference value.

\* \* \* \* \*

UNITED STATES PATENT AND TRADEMARK OFFICE
CERTIFICATE OF CORRECTION

| | |
|---|---|
| PATENT NO. | : 7,793,085 B2 |
| APPLICATION NO. | : 11/024843 |
| DATED | : September 7, 2010 |
| INVENTOR(S) | : Kenji Furuya |

Page 1 of 1

It is certified that error appears in the above-identified patent and that said Letters Patent is hereby corrected as shown below:

Title page item 54 and Col. 1 line 2

Please remove "MICROPROCESSORY" and insert --MICROPROCESSOR-- in the Title.

Signed and Sealed this

Twenty-first Day of December, 2010

David J. Kappos
*Director of the United States Patent and Trademark Office*